United States Patent
Ike et al.

(10) Patent No.: US 7,844,921 B2
(45) Date of Patent: Nov. 30, 2010

(54) INTERFACE APPARATUS AND INTERFACE METHOD

(75) Inventors: Tsukasa Ike, Tokyo (JP); Yasuhiro Taniguchi, Kanagawa-ken (JP); Ryuzo Okada, Kanagawa-ken (JP); Nobuhisa Kishikawa, Kanagawa-ken (JP); Kentaro Yokoi, Kanagawa-ken (JP); Mayumi Yuasa, Kanagawa-ken (JP); Bjorn Stenger, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 664 days.

(21) Appl. No.: 11/757,159

(22) Filed: Jun. 1, 2007

(65) Prior Publication Data
US 2008/0052643 A1 Feb. 28, 2008

(30) Foreign Application Priority Data
Aug. 25, 2006 (JP) .......................... P2006-229572

(51) Int. Cl.
G06F 3/33 (2006.01)
G09G 5/36 (2006.01)

(52) U.S. Cl. ...................................... 715/863; 345/358
(58) Field of Classification Search ................. 715/863; 345/358
See application file for complete search history.

(56) References Cited

U.S. PATENT DOCUMENTS

| | | | | |
|---|---|---|---|---|
| 6,072,494 A * | 6/2000 | Nguyen ...................... | 715/863 |
| 6,128,003 A * | 10/2000 | Smith et al. ................. | 345/157 |
| 6,191,773 B1 * | 2/2001 | Maruno et al. .............. | 345/158 |
| 6,624,833 B1 * | 9/2003 | Kumar et al. ............... | 715/863 |
| 7,099,510 B2 | 8/2006 | Jones et al. | |
| 7,225,414 B1 * | 5/2007 | Sharma et al. .............. | 715/863 |
| 7,593,552 B2 * | 9/2009 | Higaki et al. ............... | 382/118 |
| 2002/0126161 A1 * | 9/2002 | Kuzunuki et al. ........... | 345/863 |
| 2004/0042661 A1 * | 3/2004 | Ulrich et al. ................ | 382/181 |
| 2004/0189720 A1 * | 9/2004 | Wilson et al. ............... | 345/863 |
| 2005/0271279 A1 * | 12/2005 | Fujimura et al. ............ | 382/203 |
| 2006/0085414 A1 * | 4/2006 | Chai et al. ..................... | 707/5 |
| 2010/0161522 A1 * | 6/2010 | Tirpak et al. ................. | 706/11 |

FOREIGN PATENT DOCUMENTS

| | | |
|---|---|---|
| JP | 9-185456 | 7/1997 |
| JP | 11-327753 | 11/1999 |

(Continued)

OTHER PUBLICATIONS

Chen et al, "A Study of Manual Gesture-Based Selection for the PEMMI Multimodal Transport Management Interface", 2005.*

*Primary Examiner*—William L Bashore
*Assistant Examiner*—Ece Hur
(74) *Attorney, Agent, or Firm*—Oblon, Spivak, McClelland, Maier & Neustadt, L.L.P.

(57) ABSTRACT

An apparatus for a user to interface with a control object apparatus by a posture or a motion of the user's physical part. An image input unit inputs an image including the user's physical part. A gesture recognition unit recognizes the posture or the motion of the user's physical part from the image. A control unit controls the control object apparatus based on an indication corresponding to the posture or the motion. A gesture information display unit displays an exemplary image of the posture or the motion recognized for the user's reference to indicate the control object apparatus.

10 Claims, 7 Drawing Sheets

FOREIGN PATENT DOCUMENTS

| | | |
|---|---|---|
| JP | 2000-75991 | 3/2000 |
| JP | 2001-216069 | 8/2001 |
| JP | 2001-306049 | 11/2001 |
| JP | 20022922020 * | 10/2002 |
| JP | 2004-78977 | 3/2004 |
| JP | 2004078977 A * | 3/2004 |

* cited by examiner

INTERFACE APPARATUS AND INTERFACE METHOD

CROSS-REFERENCE TO RELATED APPLICATIONS

This application is based upon and claims the benefit of priority from prior Japanese Patent Application No. 2006-229572, filed on Aug. 25, 2006; the entire contents of which are incorporated herein by reference.

FIELD OF THE INVENTION

The present invention relates to an interface apparatus and an interface method for controlling an object apparatus by processing an image of a posture or a motion of a user's physical part.

BACKGROUND OF THE INVENTION

An interface apparatus to operate a control object apparatus such as a television or a computer includes an indication device such as a remote commander, a keyboard, or a mouse. However, this indication device is not easy for a user to operate because the user indirectly operates the object apparatus by the indication device. Furthermore, if the user loses the indication device, the user cannot operate the object apparatus.

Accordingly, as an interface apparatus to solve above problem, a hand gesture-user interface apparatus is proposed (JP-A (Kokai) No. 2004-78977). In this apparatus, by moving the user's hand or changing the user's hand posture, the object apparatus can be operated without the indication device.

For example, an image including the user's hand is captured by a CCD camera installed onto a display, and the user's hand posture or motion is recognized from the image. Based on the user's hand posture or motion, shape and position of indication icon displayed on a screen are changed. By such display control, the interface apparatus to be indicated by the user's hand gesture is disclosed.

In this interface apparatus, the user performs a predetermined hand gesture. For example, the user performs a predetermined hand posture, the user makes a predetermined hand gesture, or the user moves his/her hand along a predetermined locus. Briefly, by the predetermined hand gesture, the user can indicate a predetermined command or position corresponding to the gesture.

However, in above interface apparatus, the user must previously remember the hand gesture usable as the indication. This is a burden for the user to indicate by the hand gesture.

SUMMARY OF THE INVENTION

The present invention is directed to an interface apparatus and an interface method for a user to easily perform a posture or a motion of the user's physical part to control the object apparatus without remembering the posture or the motion.

According to an aspect of the present invention, there is provided an apparatus for interfacing with a control object apparatus, comprising: an image input unit configured to input an image including a user's physical part; a gesture recognition unit configured to recognize a posture or a motion of the user's physical part from the image; a control unit configured to control the control object apparatus based on an indication corresponding to the posture or the motion; and a gesture information display unit configured to display an exemplary image of the posture or the motion recognized by the gesture recognition unit.

According to another aspect of the present invention, there is also provided a method for interfacing with a control object apparatus, comprising: inputting an image including a user's physical part; recognizing a posture or a motion of the user's physical part from the image; controlling the control object apparatus based on an indication corresponding to the posture or the motion; and displaying an exemplary image of the posture or the motion recognized for the user's reference to indicate the control object apparatus.

According to still another aspect of the present invention, there is also provided a computer readable medium storing program codes for causing a computer to interface with a control object apparatus, the program codes comprising: a first program code to input an image including a user's physical part; a second program code to recognize a posture or a motion of the user's physical part from the image; a third program code to control the control object apparatus based on an indication corresponding to the posture or the motion; and a fourth program code to display an exemplary image of the posture or the motion recognized for the user's reference to indicate the control object apparatus.

DETAILED DESCRIPTION OF THE EMBODIMENTS

Figure 1:
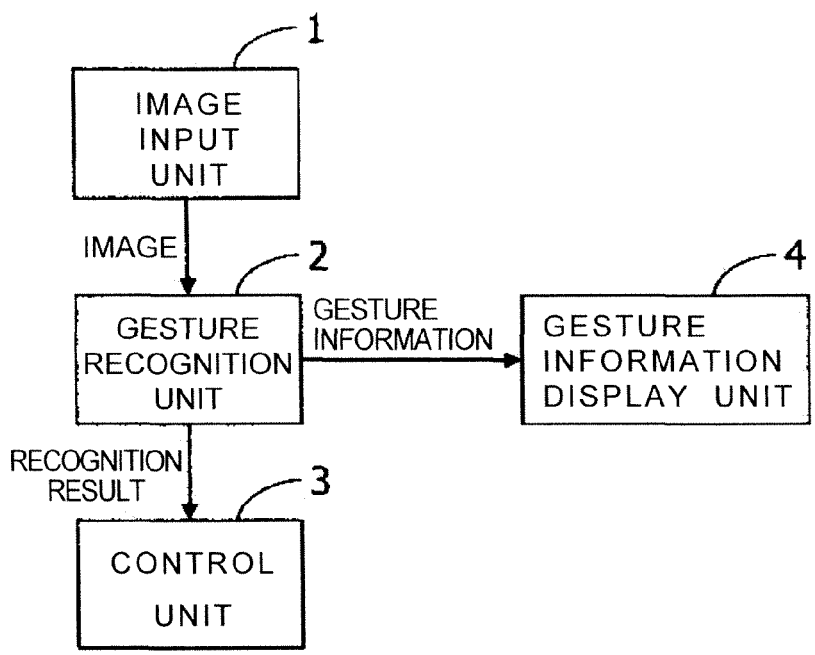
FIG. 1 is a block diagram of an HGUI apparatus according to a first embodiment.

Hereinafter, various embodiments of the present invention will be explained by referring to the drawings. The present invention is not limited to the following embodiments.

First Embodiment

Hereinafter, a hand gesture user interface apparatus (it is called a HGUI apparatus) to operate a control object apparatus is explained by referring to FIGS. 1~8. FIG. 1 is a block diagram of the HGUI apparatus according to the first embodiment. In the following explanation, a user's physical part as a recognition object is at least one hand. However, the user's physical part is not limited to the hand. For example, the user's facial expression, motion of the user's head, motion of the user's body, posture, or motion of the user's legs may be the recognition object.

In FIG. 1, an image input unit 1 inputs an image including a user's hand by a photograph device such as a CCD video camera, and supplies the image to a gesture recognition unit 2. The gesture recognition unit 2 decides a region of a recognition object (the user's hand) and a kind of gesture of the recognition object, and outputs the region and the kind of gesture. In this case, "gesture" means not only "motion" but also "posture" of the user's physical part. A control unit 3 decides control contents of a control object apparatus (not shown in FIG. 1) based on the control contents, and controls the control object apparatus. A gesture information display unit 4 displays information for the user to refer in case of indicating the HGUI apparatus.

Figure 2:
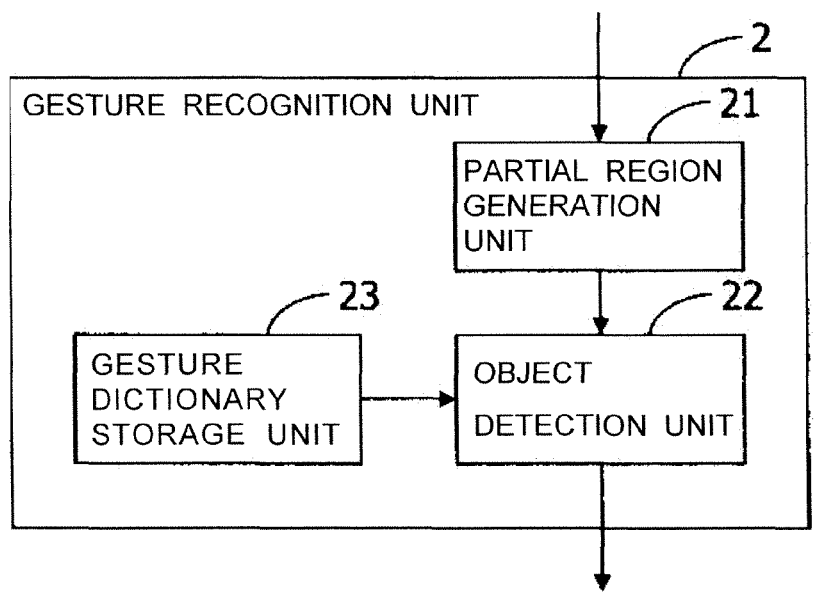
FIG. 2 is a block diagram of a gesture recognition unit 2 in FIG. 1.
Figure 3:
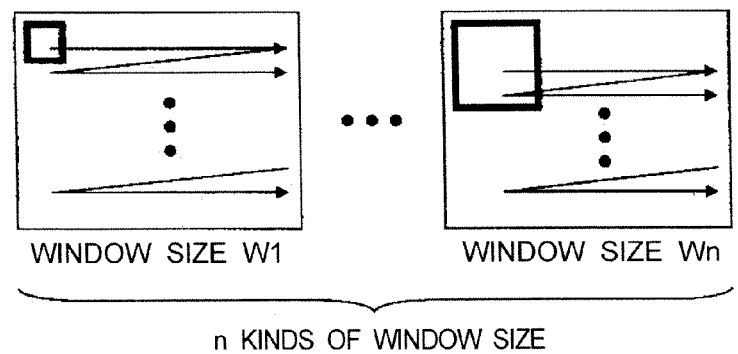
FIG. 3 is a schematic diagram of a partial region generated by a partial region generation unit 21 in FIG. 2.

Next, the gesture recognition unit 2 is explained in detail by referring to an object evaluation apparatus disclosed in U.S. Pat. No. 7,099,510 B2. FIG. 2 is a block diagram of the gesture recognition unit 2. In FIG. 2, a partial region generation unit 21 sets a plurality of partial regions having various sizes at various positions on the input image, extracts an inner image of each partial region from the input image, and supplies the inner image of each partial region to an object detection unit 22. In case of setting each partial region, as shown in FIG. 3, window sizes W1~Wn are prepared, and each window size is scanned on the input image. In this way, an inner image of each window size at each scanning position is extracted as a partial region image from the input image.

The object detection unit 22 normalizes the partial region image to a predetermined size, and decides whether the partial region image represents a recognition object (user's hand) by referring to dictionary data stored in a gesture dictionary storage unit 23.

Figure 4:
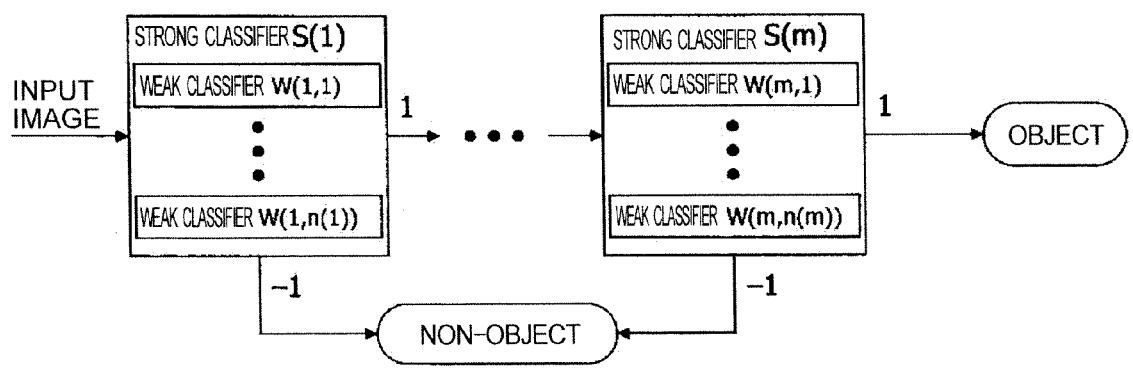
FIG. 4 is a schematic diagram of a plurality of classifiers of an object detection unit 22 in FIG. 2.

As shown in FIG. 4, decision of the recognition object is executed by strong classifiers S(1), . . . , S(m) of m units connected in series. Each strong classifier S comprises weak classifiers W(1), . . . , W(n) of n units. Each weak classifier W decides whether the partial region image represents the recognition object by evaluating a predetermined part of the partial region image.

The strong classifier S totally evaluates decision results of the weak classifiers of n units, and decides whether the partial region image represents the recognition object. If all strong classifiers S indicate the partial recognition image is the recognition object, the object detection unit 22 decides the partial region image is the recognition object.

Figure 5:
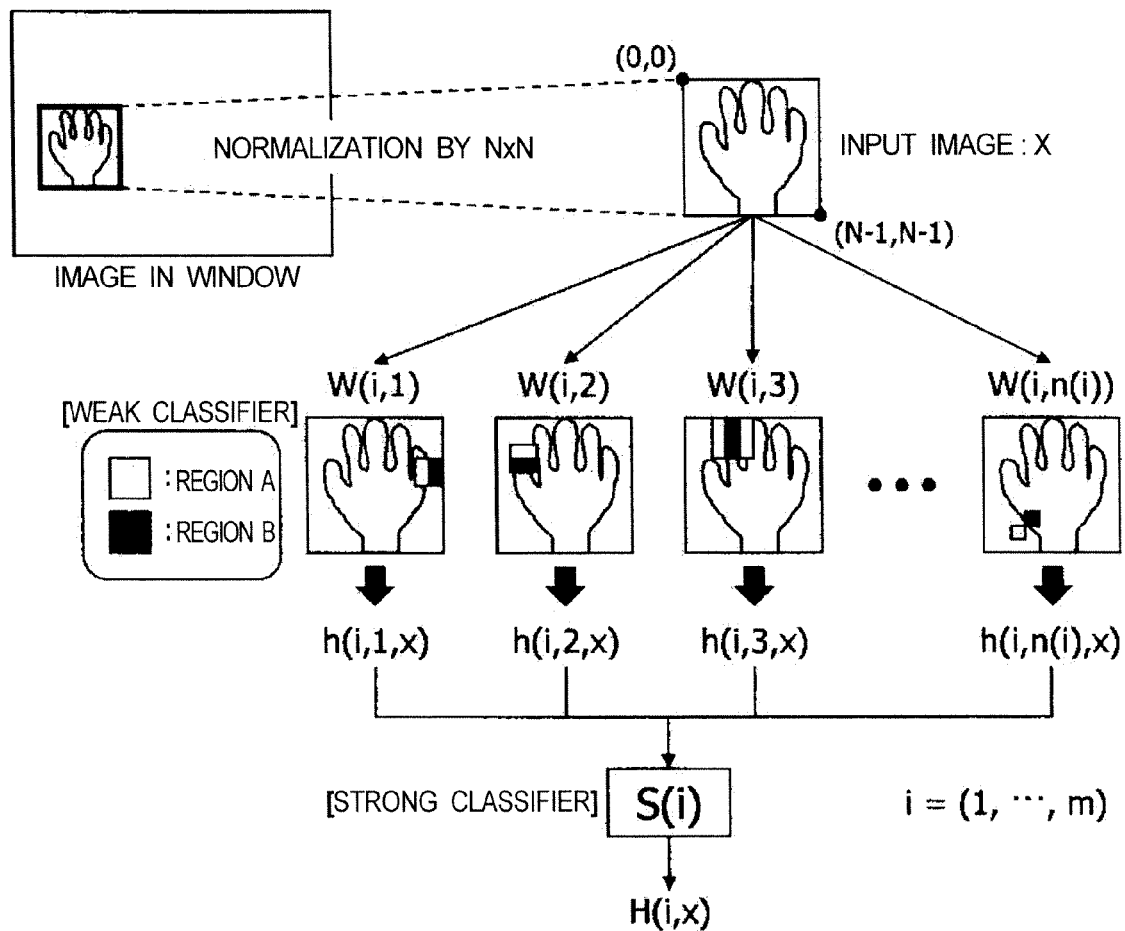
FIG. 5 is a schematic diagram to explain processing of the object detection unit 22.

Next, method for evaluating the partial region image by the weak classifier W is explained by referring to FIG. 5. After normalizing the partial region image to N×N size, each weak classifier W(i,1), . . . , W(i,n(i)) in the strong classifier i decides whether the partial region image represents the recognition object (user's hand).

As to a region A and a region B (defined by each classifier W), sum SA of brightness values of all pixels in the regions A is calculated and sum SB of brightness values of all pixels in the regions B is calculated. A difference between SA and SB is calculated and the difference is compared with an object decision threshold T. In this case, as shown in FIG. 5, two regions A and B are respectively represented by one or two rectangle region. As to position and shape of regions A and B, and a value of the object decision threshold T, by the learning using an object image and non-object image, the position, the shape and the value to effectively decide the object and non-object are previously selected.

A decision result h(i, j, x) by the weak classifier W is calculated as follows.

$$h(i, j, x) = \begin{cases} 1 & \text{if } p(i, j) \cdot (S_A(i, j, x) - S_B(i, j, x)) T(i, j) \\ -1 & \text{otherwise} \end{cases} \quad (1)$$

In the above equation (1), $S_A(i, j, x)$ is sum of brightness values of region A, $S_B(i, j, x)$ is sum of brightness values of region B, and $T(i,j)$ is the object decision threshold in the weak classifier $W_j$ composing the strong classifier $S_i$. Furthermore, "p(i,j)={1,−1}" means a parity value. In case of "p(i,j)=−1", the object is decided on condition that "$S_A(i, j, x) - S_B(i, j, x) < T(i,j)$".

A decision result H(i,x) of the strong classifier i is calculated by the evaluation result h(i, j, x) of each weak classifier W as follows.

$$H(i, x) = \begin{cases} 1 & \text{if } \Sigma(\alpha(i, j) \cdot h(i, j, x)) \geq 0 \\ -1 & \text{otherwise} \end{cases} \quad (2)$$

In above equation (2), α(i,j) represents reliability of the weak classifier W(i,j), which is determined based on correct answer ratio in image for learning.

Next, final decision result by the object detection unit 22 is represented by the following equation.

$$C(x) = \begin{cases} 1 & \text{if } H(i, x) = 1 \text{ for } i = \{1, \dots, m\} \\ -1 & \text{otherwise} \end{cases} \quad (3)$$

In case of deciding plural kinds of recognition objects, the classifier is prepared for each recognition object, and the above decision processing is executed for each recognition object by the corresponding classifier.

Gesture recognition method is not limited to above method. For example, by generating a contour image from the input image, a similarity between the contour image and a template image of the recognition object may be evaluated. Furthermore, by generating a skin colored region from the input image, a pattern similarity between the skin colored region and a template region of the recognition object may be calculated.

Next, the control unit 3 determines control contents based on a position and a kind of hand gesture recognized by the gesture recognition unit 2. One example of control processing by the control unit 3 is explained by referring to FIG. 6.

Figure 6:
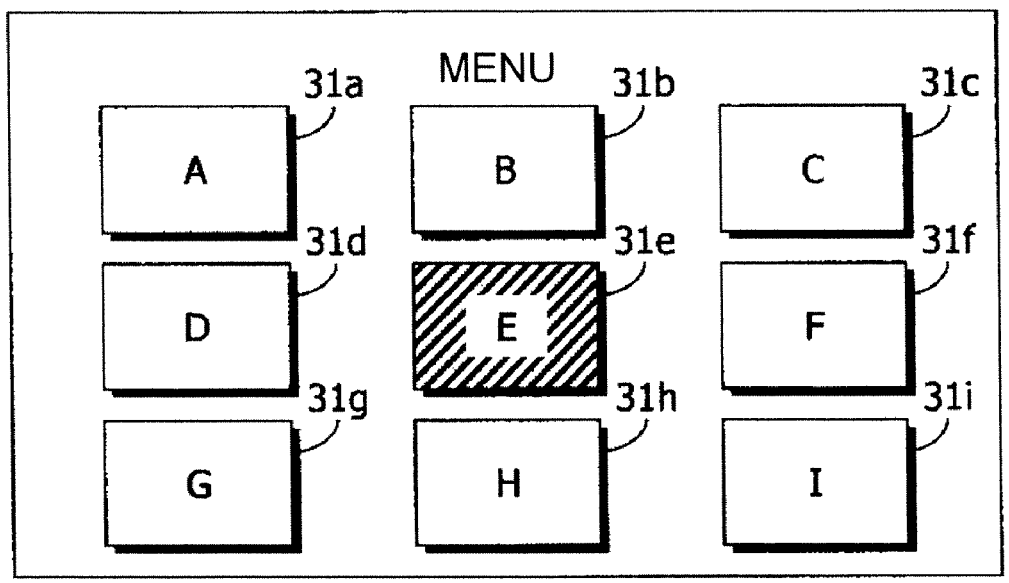
FIG. 6 is a schematic diagram of one example of a screen controlled by a control unit in FIG. 1.

FIG. 6 shows a menu screen displayed on a monitor. This menu screen is used to inform internal status of the control unit 3 to the user. The menu screen is composed by a plurality of rectangle regions 31a~31i each related with a predetermined command. In FIG. 6, a rectangle region 31e is represented by a color (hatching) different from the other rectangle regions. This means a command corresponding to the rectangle region 31e selected at present.

Figure 7A:
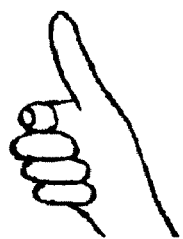
FIGS. 7A and 7B are schematic diagrams of hand gesture for operation.

The user moves his/her hand along top and bottom and right and left directions in front of the image input unit 1 while keeping hand posture in FIG. 7A. In response to the user's hand motion, the control unit 3 changes a rectangle region selected on the menu screen. For example, in FIG. 6, when the user moves his/her hand along the left direction as a fixed distance while keeping hand posture of FIG. 7A, selection status of the rectangle region 31e is released, and a rectangle region 31d is selected.

Figure 7B:
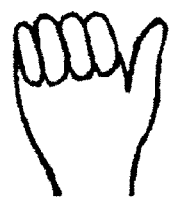

Then the user performs hand posture of FIG. 7B in front of the image input unit 1. In response to this posture, the control unit 3 executes a command related with the rectangle region selected at present. For example, in status of FIG. 6, when the user performs hand posture of FIG. 7B, the control unit 3 executes a command (For example, recording reservation or video library call in video recorder) related with the rectangle region 31e.

In the HGUI apparatus, in case of indication, the user must remember hand gestures shown in FIGS. 7A and 7B. As a result, the user must try to correctly remember each kind of hand gesture for operation, or must operate by referring to an explanatory note. This is a burden for the user.

Figure 8:
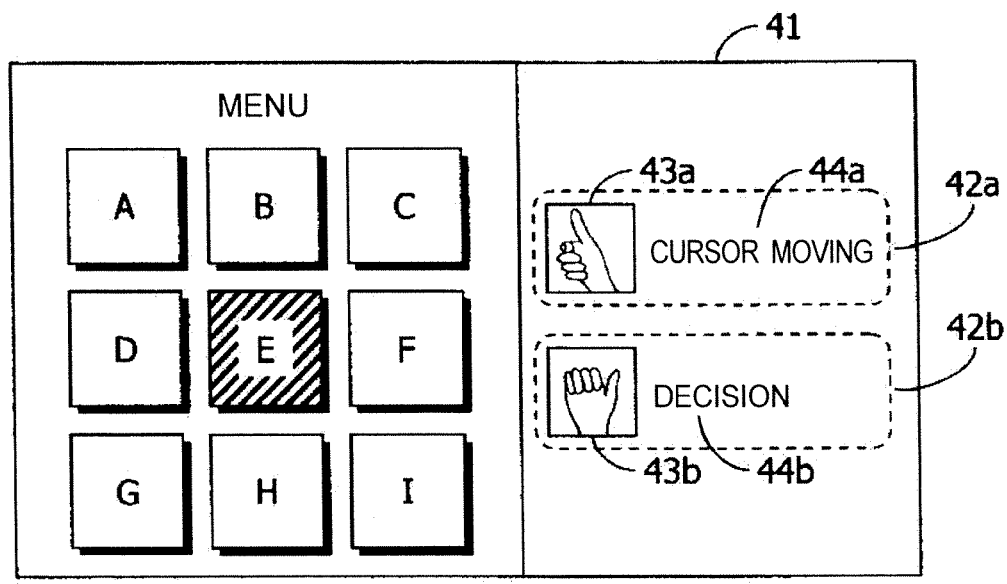
FIG. 8 is a schematic diagram of one example of hand gesture user interface by a gesture information display unit 4 in FIG. 1.

Accordingly, in the first embodiment, the gesture information display unit 4 presents each kind of hand gesture for operation to the user. Processing of the gesture information display unit 4 is explained by referring to FIG. 8. FIG. 8 shows a menu screen set on a gesture information display unit 4 in addition to the menu screen of FIG. 6.

The gesture information display unit 4 includes a gesture list display unit 41. The gesture list display unit 41 comprises at least one recognition object gesture display unit 42a (42b) to display an exemplary gesture as a recognition object for the gesture recognition unit 2. The recognition object gesture display unit 42a (42b) comprises a gesture image display unit 43a (43b) and a gesture name display unit 44a (44b).

The gesture image display unit 43a (43b) displays an image visually representing a recognition object gesture. This image may be a static image or a dynamic image. For example, in case of gesture as hand posture, a static image of exemplary hand posture (Hereinafter, it is called an exemplary hand posture) recognizable by the gesture recognition unit 2 is displayed.

Furthermore, in case of gesture as hand motion, an illustration of an exemplary hand locus may be displayed. Alternatively, a dynamic image of actual hand motion may be displayed. The gesture name display unit 44a (44b) displays a name of the recognition object gesture.

As mentioned-above, in the HGUI apparatus of the first embodiment, an exemplary image of each gesture for operation is displayed on the gesture information display unit 4. Accordingly, the user can operate the interface apparatus by confirming the exemplary gesture image without previously remembering the gesture. As a result, operability of the interface apparatus can improve.

(Modification 1)

The purpose of the recognition object gesture display unit 42a (42b) is visual presentation of gesture as a recognition object of the gesture recognition unit 2 to a user. Accordingly, various modifications able to fulfill this purpose can be considered. For example, the recognition object gesture display unit 42a (42b) may be composed by the gesture image display unit 43a (43b) only.

(Modification 2)

The gesture information display unit 4 is not limited to application to the HGUI apparatus of FIG. 6, and can be applied to another kind of HGUI apparatus. For example, in the HGUI apparatus disclosed in JP-A (Kokai) No. 2004-78977, the gesture information display unit 4 may be set on a part of the display screen.

(Modification 3)

The gesture information display unit 4 need not be set on a screen of the control object apparatus. A screen display apparatus (For example, a small-sized display or a PDA) to display gesture information may be specially prepared. For example, the control object apparatus may display a menu screen of FIG. 6 (without the gesture list display unit 41) while another screen display apparatus displays gesture information. Furthermore, in the HGUI apparatus to operate a control object apparatus (For example, an air conditioner) without a screen display, gesture information may be displayed on a screen display apparatus by the user side.

Second Embodiment

Hereinafter, the HGUI apparatus of the second embodiment is explained by referring to FIGS. 9~13. In the first embodiment, a list (exemplary images) of hand gestures for operation is displayed on the gesture information display unit 4. In this case, a user can operate by confirming the list without remembering the relationship between a kind of gesture for operation and an exemplary hand gesture.

However, even if the user performs hand gesture by referring to the exemplary hand gesture, the user's hand posture does not always match the exemplary hand gesture. As a result, the HGUI apparatus does not correctly recognize the user's hand gesture.

In this case, the user cannot understand how the HGUI apparatus recognizes the user's hand gesture. Accordingly, the user cannot correct his/her gesture for recognition by the HGUI apparatus. In other words, the user cannot smoothly operate the interface apparatus.

In the second embodiment, the HGUI apparatus prepares a recognition result display unit 61 to display a gesture recognition result. In this case, the user can understand how the HGUI apparatus recognizes the user's hand gesture. As a result, the user can correct his/her hand gesture by referring to the recognition result.

Figure 9:
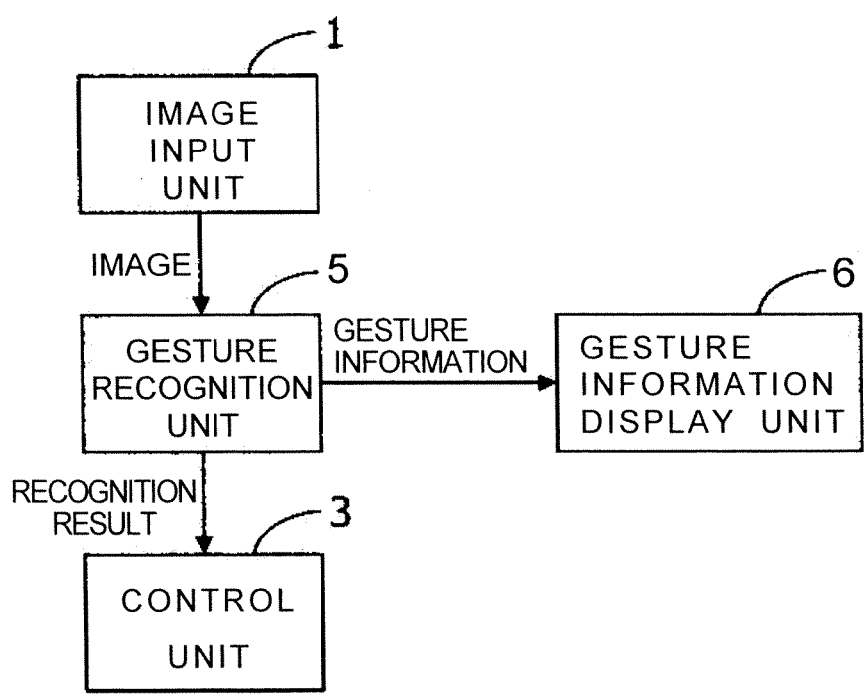
FIG. 9 is a block diagram of the HGUI apparatus according to a second embodiment.

FIG. 9 is a block diagram of the HGUI apparatus according to the second embodiment. In the second embodiment, functions of the gesture recognition unit 5 and the gesture information display unit 6 are different from the first embodiment In the following explanation, as to a unit having the same component (function) as the first embodiment, the same reference number is assigned and its explanation is omitted. The image input unit 1 and the control unit 3 of the second embodiment are same as FIG. 1 of the first embodiment. Accordingly, their explanations are omitted.

Figure 10:
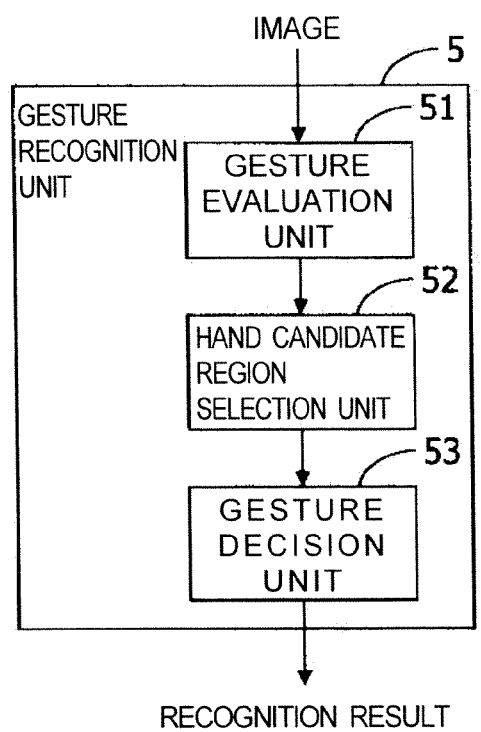
FIG. 10 is a block diagram of a gesture recognition unit 5 in FIG. 9.

FIG. 10 is a block diagram of a gesture recognition unit 5 according to the second embodiment. A gesture evaluation unit 51 sets various partial regions on the input image, and evaluates the possibility that each partial region includes a detection object's gesture. Thus the gesture evaluation unit 51 calculates a score of each partial region based on the evaluation result, and outputs the score.

As a method for calculating the score, in case of the gesture recognition method explained in FIGS. 4 and 5, the score is calculated by evaluation result and reliability of the weak classifier W in the equation (2) as follows.

$$\sum_i \sum_j (h(i, j, x) \cdot \alpha(i, j)) \quad (4)$$

Furthermore, in a method for evaluating a similarity between a contour image (extracted from an input image) and a template image or a method for evaluating a pattern similarity between a skin colored region and a template region, the similarity may be used as a score.

A hand candidate region selection unit 52 selects a partial region having the highest score from a plurality of partial regions evaluated by the gesture evaluation unit 51. In the second embodiment, the partial region having the highest score may be selected as a hand candidate region. However, in case of simultaneously recognizing gestures of a plurality of persons, a plurality of partial regions having higher order of scores may be selected.

A gesture decision unit 53 decides whether the hand candidate region includes a recognition object's gesture. In case of using the gesture recognition method in FIGS. 4 and 5, this decision is executed using the equation (3).

Figure 11:
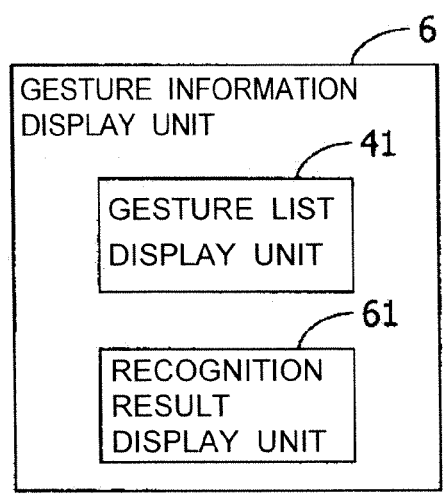
FIG. 11 is a block diagram of a gesture information display unit 6 in FIG. 9.

FIG. 11 is a block diagram of a gesture information display unit 6 according to the second embodiment. Function of a gesture list display unit 41 is the same as FIG. 8. Accordingly, its explanation is omitted.

A recognition result display unit 61 displays a gesture recognition result. The recognition result includes at least information about which hand gesture is recognized by the gesture recognition unit 5. As to the information, a kind of extracted gesture may be included. Furthermore, as to a hand candidate region selected by the hand candidate region selection unit 52, a probability that the hand candidate region represents each hand gesture (evaluated by the gesture evaluation unit 51), and a threshold to decide whether the hand candidate region represents each hand gesture, may be included.

Figure 12:
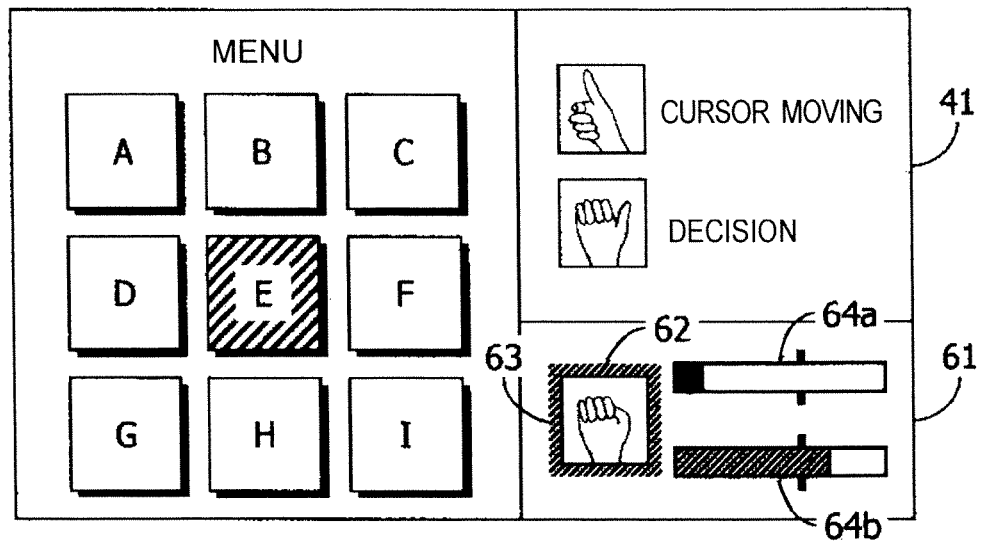
FIG. 12 is a schematic diagram of one example of hand gesture user interface by the gesture information display unit 6 in FIG. 11.

Next, processing of the gesture information display unit 6 is further explained by referring to FIG. 12. FIG. 12 is one example of a menu screen preparing the gesture information display unit 6.

In FIG. 12, the recognition result display unit 61 comprises a hand candidate region image display unit 62, a gesture detection result display unit 63, and a gesture probability display unit 64a (64b). The hand candidate region image display unit 62 displays a partial region image in the hand candidate region. The gesture detection result display unit 63 displays whether a user's hand gesture is recognized as the exemplary gesture (detection object). The gesture probability display unit 64a (64b) displays a probability that the hand candidate region represents the exemplary gesture.

The hand candidate region image display unit 62 displays an image of the hand candidate region selected by the hand candidate region selection unit 22.

The gesture detection result display unit 63 is set as an outer frame of the hand candidate region image display unit 62. A gesture detection result is shown by color of the gesture detection result display unit 63. A color peculiar to each recognition object gesture may be previously determined (For example, cursor moving gesture is blue, decision gesture is red) In case of recognizing the hand candidate region as the recognition object gesture, by changing the color of the gesture detection result display unit 63 to the color corresponding to the recognized gesture, a matter that the hand candidate region is recognized as a gesture corresponding to the color is informed to the user. Furthermore, when the hand candidate region is not recognized as any gesture, by changing the color of the gesture detection result display unit 63 to a color representing non-recognition (For example, colorless), a matter that the hand candidate region is not recognized is informed to the user.

The gesture probability display unit 64a (64b) is set as a bar graph prepared for each recognition object gesture. The bar graph is displayed as a length based on a score value (probability) that the hand candidate region represents the corresponding hand gesture (calculated by the gesture evaluation unit 51). Furthermore, color of the bar graph is set as color peculiar to each recognition object gesture (same color as the gesture detection result display unit 63). Accordingly, the user can understand that the probability corresponds to which hand gesture.

Briefly, by confirming an image displayed on the hand candidate region image display unit 62, the user can understand how the user's hand gesture is viewed by the image input unit 1. Furthermore, by confirming the color of the gesture detection result display unit 63, the user can visually confirm the gesture detection result.

Furthermore, by comparing an image of the hand candidate region image display unit 62 with an image of the gesture image display unit 43, or by confirming a probability of the gesture probability display unit 64a (64b), the user can confirm how the user's hand gesture is different from an exemplary gesture. As a result, the user can correct his/her gesture to a gesture that the HGUI apparatus will recognize, and can smoothly operate the control object apparatus.

As mentioned-above, in the HGUI apparatus of the second embodiment, the recognition result display unit 61 displays how the user's hand gesture is recognized. Accordingly, by confirming this recognition result, the user can change his/her hand gesture to a gesture that the HGUI apparatus will recognize, and operability of the HGUI apparatus further improves.

(Modification 1)

In the second embodiment, the recognition result display unit 61 prepares the hand candidate region image display unit 62 and the gesture probability display unit 64a (64b). However, both units 62 and 64a (64b) are not always necessary. Even if any one unit is prepared, above problem can be solved. Briefly, if the hand candidate region image display unit 62 is only prepared, by correcting hand gesture so that the hand candidate region image is similar to the exemplary gesture image, the user can perform the hand gesture easy to be recognized by the HGUI apparatus.

(Modification 2)

If the gesture probability display unit 64a (64b) is only prepared, by confirming the probability, the user variously changes his/her hand gesture and finds one hand gesture having the highest probability. As a result, the user can perform the hand gesture easy to be recognized by the HGUI apparatus.

(Modification 3)

Function of the gesture detection result display unit 63 may be replaced with the gesture probability display unit 64a (64b) As shown in FIG. 12, by displaying a mark corresponding to a gesture decision threshold on the bar graph, the user can understand whether his/her hand gesture is recognized by checking whether length of bar graph is over the threshold. Alternatively, a gesture name corresponding to the recognized hand gesture on the gesture list display unit 41 may be highlighted.

(Modification 4)

The gesture probability display unit 64a (64b) may be outlook except for the bar graph. For example, a probability value itself may be displayed instead of the bar graph.

(Modification 5)

Figure 13:
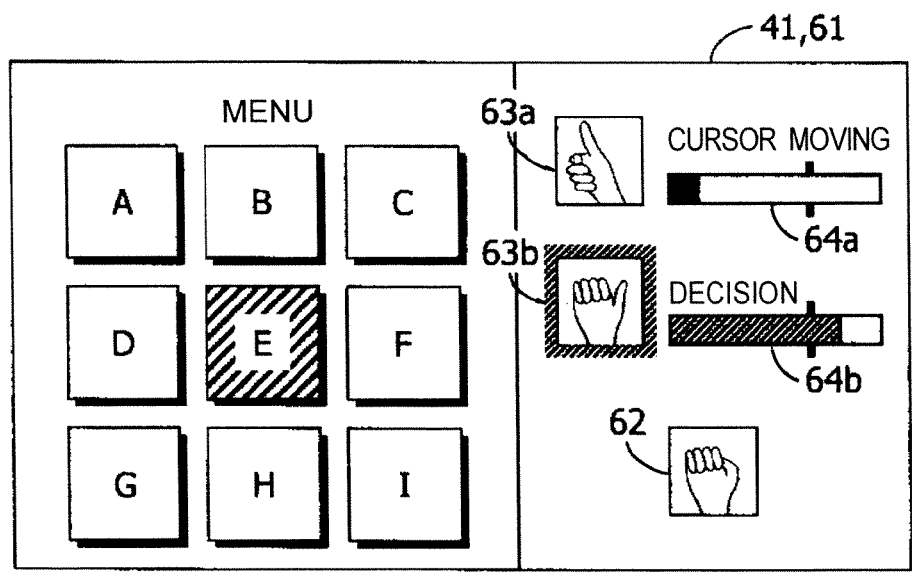
FIG. 13 is a schematic diagram of another example of hand gesture user interface by the gesture information display unit 6 in FIG. 11.

The gesture list display unit 41 and the recognition result display unit 61 need not be respectively displayed on different area. As shown in FIG. 13, a display unit having merged function of both units 41 and 61 may be set.

Instead of the gesture detection result display unit 63 (in FIG. 12) set around the hand candidate region image display unit 62, as shown in FIG. 13, the gesture detection result display unit 63a (63b) is set around the exemplary gesture image (on the gesture list display unit 41) corresponding to each gesture. A color of each gesture changes when the user's hand gesture is recognized as a gesture corresponding to the color. Accordingly, a matter that the user's hand gesture is recognized is informed to the user. Furthermore, by setting the gesture probability display unit 64*a* (64*b*) at lower part of each gesture name on the gesture list display unit 41, the user can easily understand relationship between the probability and the gesture.

(Modification 6)

As to a user's hand motion (gesture), the recognition result display unit 61 displays a recognition result. For example, as to a series of hand candidate regions (Hereinafter, they are called hand motion candidates) detected, hand motion candidate information (positional time sequence and hand candidate region images) is stored in a hand candidate region information memory (not shown in FIG. 9).

As a method for detecting the hand motion candidate, the known tracking method based on hand boundary information is used. As to positional time sequence of hand motion candidate detected, a distance d between the positional time sequence and the ideal positional time sequence is calculated. Briefly, a distance between ideal hand motion and a user's hand motion is calculated.

As a method for calculating the distance d, a method such as DP matching may be used. Based on the distance d and normal distribution N(μ, ρ²) of ideal hand motion, a probability p that the user's hand motion is the ideal hand motion is calculated as follows.

$$p = \frac{1}{\sqrt{2\pi}\,\sigma} \exp\left(-\frac{(d-\mu)^2}{2\sigma^2}\right) \quad (5)$$

The probability p is displayed on the gesture probability display unit 63, and a series of hand candidate region images are displayed on the hand candidate region image display unit 62 in synchronization with dynamic images of ideal hand motion on the gesture list display unit 41. Accordingly, a matter how the user's hand motion is recognized by the HGUI apparatus can be informed to the user.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software) such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for interfacing with a control object apparatus, comprising:
    an image input unit configured to input an image including a user's physical part;
    a gesture recognition unit configured to recognize a posture or a motion of the user's physical part from the image;
    a control unit configured to control the control object apparatus based on an indication corresponding to the posture or the motion; and
    a gesture information display unit configured to display an exemplary image of the posture or the motion recognized by the gesture recognition unit, wherein the gesture recognition unit includes a gesture evaluation unit configured to calculate a probability that the posture or the motion is included in each partial region of the image;
    a candidate region selection unit configured to select at least one partial region having a highest probability as a physical part candidate region; and
    a gesture decision unit configured to decide that the posture or the motion is included in the physical part candidate region when the probability is above a threshold, which indication the posture or motion included in the physical part candidate region represents, and the gesture information display unit displays the posture or the motion recognized by the gesture recognition unit, the probability that the posture or motion is included in each partial region of the image, and a graph of a probability that the posture or the motion represents each indication.

2. The apparatus according to claim 1, wherein the gesture information display unit displays an image of the physical part candidate region.

3. The apparatus according to claim 2, wherein the gesture information display unit discriminately displays the image of the physical part candidate region based on the indication represented by the posture or the region.

4. The apparatus according to claim 1, wherein the gesture information display unit discriminately displays the probability that the posture or the motion represents each indication.

5. The apparatus according to claim 1, wherein the gesture information display unit additionally displays a mark of the threshold on the graph.

6. The apparatus according to claim 1, wherein the gesture information display unit discriminately displays an exemplary image of the indication represented by the posture or the motion included in the physical part candidate region.

7. The apparatus according to claim 6, wherein the gesture information display unit displays the exemplary image and the graph, each corresponding to the same indication.

8. The apparatus according to claim 7, wherein the gesture information display unit displays a plurality of menus, a plurality of exemplary images, and a graph of each exemplary image, and discriminately displays at least one of the plurality of menus based on the indication.

9. A method for interfacing with a control object apparatus, comprising:
inputting an image including a user's physical part; recognizing a posture or a motion of the user's physical part from the image; controlling the control object apparatus based on an indication corresponding to the posture or the motion; and displaying an exemplary image of the posture or the motion recognized for a user's reference to indicate the control object apparatus,
wherein the recognizing includes calculating a probability that the posture or the motion is included in each partial region of the image;
selecting at least one partial region having a highest probability as a physical part candidate region; deciding that the posture or the motion is included in the physical part candidate region when the probability is above a threshold, deciding which indication the posture or the motion included in the physical part candidate region represents, and the displaying includes displaying the posture or the motion recognized, and the probability that the posture or motion is included in each partial region of the image, and a graph of a probability that the posture or the motion represents each indication.

10. A computer readable medium storing computer-readable instructions thereon for a control object apparatus, the computer-readable instructions when executed by the control object apparatus cause the control object apparatus to perform a method comprising:
inputting an image including a user's physical part;
recognizing a posture or a motion of the user's physical part from the image;
controlling the control object apparatus based on an indication corresponding to the posture or the motion; and
displaying an exemplary image of the posture or the motion recognized for the user's reference to indicate the control object apparatus,
wherein the recognizing includes
calculating a probability that the posture or the motion is included in each partial region of the image;
selecting at least one partial region having a highest probability as a physical part candidate region; and
deciding that the posture or the motion is included in the physical part candidate region when the probability is above a threshold,
deciding which indication the posture or motion included in the physical part candidate region represents, and
the displaying includes displaying
the posture or the motion recognized, and
the probability that the posture or motion is included in each partial region of the image, and
a graph of a probability that the posture or motion represents each indication.

* * * * *